United States Patent
Atiya et al.

(10) Patent No.: US 11,843,222 B2
(45) Date of Patent: *Dec. 12, 2023

(54) GUIDANCE FOR INTRAORAL SCANNING

(71) Applicant: Align Technology, Inc., San Jose, CA (US)

(72) Inventors: Yossef Atiya, Maccabim (IL); Tal Verker, Ofra (IL)

(73) Assignee: Align Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,857

(22) Filed: Jun. 8, 2022

(65) Prior Publication Data

US 2022/0302677 A1  Sep. 22, 2022

Related U.S. Application Data (60) Continuation of application No. 16/933,916, filed on Jul. 20, 2020, now Pat. No. 11,387,627, which is a
(Continued)

(51) Int. Cl.
| | |
|---|---|
| *H01S 5/00* | (2006.01) |
| *H01S 5/068* | (2006.01) |
| *H01S 5/183* | (2006.01) |
| *H01S 5/42* | (2006.01) |
| *F21V 5/04* | (2006.01) |

(52) U.S. Cl.
CPC ......... *H01S 5/06817* (2013.01); *H01S 5/005* (2013.01); *H01S 5/0071* (2013.01); *H01S 5/183* (2013.01); *H01S 5/42* (2013.01); *H01S 5/423* (2013.01); *F21V 5/04* (2013.01); *H01S 2301/02* (2013.01); *H01S 2301/04* (2013.01); *H01S 2301/206* (2013.01)

(58) Field of Classification Search
CPC .... H01S 5/06817; H01S 5/005; H01S 5/0071; H01S 5/183; H01S 5/42; H01S 5/423; H01S 2301/02; H01S 2301/04; H01S 2301/206

See application file for complete search history.

(56) References Cited

U.S. PATENT DOCUMENTS

| | | |
|---|---|---|
| 6,334,772 B1 | 1/2002 | Taub et al. |
| 6,334,853 B1 | 1/2002 | Kopelman et al. |
| (Continued) | | |

*Primary Examiner* — Kinam Park
(74) *Attorney, Agent, or Firm* — Lowenstein Sandler LLP (57) ABSTRACT

In embodiments, a system for scanning an intraoral cavity comprises an intraoral scanner to generate intraoral scan data of the intraoral cavity and viewfinder images of the intraoral cavity, a display, and a processing unit operatively connected to the intraoral scanner and to the display. The processing unit is to: receive the intraoral scan data and the viewfinder images from the intraoral scanner; generate a three-dimensional (3D) digital model of the intraoral cavity using the intraoral scan data; output the 3D digital model to the display; output the viewfinder images to the display; determine which portions of the intraoral cavity have been scanned; determine a current field of view of the intraoral scanner; determine a visual indicator that provides guidance for positioning and orienting the field of view of the intraoral scanner; and output the visual indicator to the display.

22 Claims, 9 Drawing Sheets

Related U.S. Application Data continuation of application No. 16/192,359, filed on Nov. 15, 2018, now Pat. No. 10,756,511, which is a continuation of application No. 15/490,531, filed on Apr. 18, 2017, now Pat. No. 10,148,066, which is a division of application No. 14/470,832, filed on Aug. 27, 2014, now Pat. No. 9,660,418.

(56) References Cited

U.S. PATENT DOCUMENTS

| | | |
|---|---|---|
| 6,402,707 B1 * | 6/2002 | Ernst .................. A61C 9/0046 433/29 |
| 6,463,344 B1 | 10/2002 | Pavlovskaia et al. |
| 6,542,249 B1 | 4/2003 | Kofman et al. |
| 6,633,789 B1 | 10/2003 | Nikolskiy et al. |
| 6,664,986 B1 | 12/2003 | Kopelman et al. |
| 6,697,164 B1 | 2/2004 | Babayoff et al. |
| 6,845,175 B2 | 1/2005 | Kopelman et al. |
| 6,979,196 B2 | 12/2005 | Nikolskiy et al. |
| 7,030,383 B2 | 4/2006 | Babayoff et al. |
| 7,202,466 B2 | 4/2007 | Babayoff et al. |
| 7,255,558 B2 | 8/2007 | Babayoff et al. |
| 7,286,954 B2 | 10/2007 | Kopelman et al. |
| 7,319,529 B2 | 1/2008 | Babayoff |
| 7,373,286 B2 | 5/2008 | Nikolskiy et al. |
| 7,507,088 B2 | 3/2009 | Taub et al. |
| 7,545,372 B2 | 6/2009 | Kopelman et al. |
| 7,698,068 B2 | 4/2010 | Babayoff |
| 7,916,911 B2 | 3/2011 | Kaza et al. |
| 8,108,189 B2 | 1/2012 | Chelnokov et al. |
| 8,244,028 B2 | 8/2012 | Kuo et al. |
| 8,451,456 B2 * | 5/2013 | Babayoff ............. A61B 1/0676 250/559.49 |
| 8,577,212 B2 * | 11/2013 | Thiel .................... G01B 11/24 348/46 |
| 8,587,582 B2 | 11/2013 | Matov et al. |
| 8,948,482 B2 | 2/2015 | Levin |
| D742,518 S | 11/2015 | Barak et al. |
| 9,192,305 B2 | 11/2015 | Levin |
| 9,299,192 B2 | 3/2016 | Kopelman |
| D760,901 S | 7/2016 | Barak et al. |
| 9,393,087 B2 | 7/2016 | Moalem |
| 9,408,679 B2 | 8/2016 | Kopelman |
| 9,431,887 B2 | 8/2016 | Boltanski |
| 9,451,873 B1 | 9/2016 | Kopelman et al. |
| D768,861 S | 10/2016 | Barak et al. |
| D771,817 S | 11/2016 | Barak et al. |
| 9,491,863 B2 | 11/2016 | Boltanski |
| D774,193 S | 12/2016 | Makmel et al. |
| 9,510,757 B2 | 12/2016 | Kopelman et al. |
| 9,668,829 B2 | 6/2017 | Kopelman |
| 9,675,430 B2 | 6/2017 | Verker et al. |
| 9,717,402 B2 | 8/2017 | Lampert et al. |
| 9,724,177 B2 | 8/2017 | Levin |
| 9,844,426 B2 | 12/2017 | Atiya et al. |
| 10,076,389 B2 | 9/2018 | Wu et al. |
| 10,098,714 B2 | 10/2018 | Kuo |
| 10,108,269 B2 | 10/2018 | Sabina et al. |
| 10,111,581 B2 | 10/2018 | Makmel |
| 10,111,714 B2 | 10/2018 | Kopelman et al. |
| 10,123,706 B2 | 11/2018 | Elbaz et al. |
| 10,136,972 B2 | 11/2018 | Sabina et al. |
| 10,380,212 B2 | 8/2019 | Elbaz et al. |
| 10,390,913 B2 | 8/2019 | Sabina et al. |
| 10,453,269 B2 | 10/2019 | Furst |
| 10,456,043 B2 | 10/2019 | Atiya et al. |
| 10,499,793 B2 | 12/2019 | Ozerov et al. |
| 10,504,386 B2 | 12/2019 | Levin et al. |
| 10,507,087 B2 | 12/2019 | Elbaz et al. |
| 10,517,482 B2 | 12/2019 | Sato et al. |
| 10,695,150 B2 | 6/2020 | Kopelman et al. |
| 10,708,574 B2 | 7/2020 | Furst et al. |
| 10,772,506 B2 | 9/2020 | Atiya et al. |
| 10,813,727 B2 | 10/2020 | Sabina et al. |
| 10,888,399 B2 | 1/2021 | Kopelman et al. |
| 10,952,816 B2 | 3/2021 | Kopelman |
| 10,980,613 B2 | 4/2021 | Shanjani et al. |
| 11,013,581 B2 | 5/2021 | Sabina et al. |
| D925,739 S | 7/2021 | Ariel et al. |
| 11,096,765 B2 | 8/2021 | Yossef et al. |
| 11,238,586 B2 | 2/2022 | Mikhail et al. |
| 11,367,192 B2 | 6/2022 | Avi et al. |
| 2016/0367336 A1 * | 12/2016 | Lv ........................ A61C 1/0015 |
| 2019/0029784 A1 | 1/2019 | Moalem et al. |
| 2019/0388193 A1 | 12/2019 | Ofer et al. |
| 2020/0281702 A1 | 9/2020 | Avi et al. |
| 2020/0315434 A1 | 10/2020 | Kopelman et al. |
| 2020/0349705 A1 | 11/2020 | Mikhail et al. |
| 2020/0404243 A1 | 12/2020 | Saphier et al. |
| 2021/0030503 A1 | 2/2021 | Shalev et al. |
| 2021/0059796 A1 | 3/2021 | Weiss et al. |
| 2021/0068773 A1 | 3/2021 | Moshe et al. |
| 2021/0121049 A1 | 4/2021 | Rudnitsky et al. |
| 2021/0128281 A1 | 5/2021 | Peleg |
| 2021/0137653 A1 | 5/2021 | Saphier et al. |
| 2021/0196152 A1 | 7/2021 | Saphier et al. |

* cited by examiner

GUIDANCE FOR INTRAORAL SCANNING

RELATED APPLICATIONS

This application is a continuation application of U.S. application Ser. No. 16/933,916, filed Jul. 20, 2020, which is a continuation application of U.S. application Ser. No. 16/192,359, filed Nov. 15, 2018, now U.S. Pat. No. 10,756,511, issued Aug. 25, 2020, which is a continuation application of U.S. application Ser. No. 15/490,531, filed Apr. 18, 2017, now U.S. Pat. No. 10,148,066, issued Dec. 4, 2018, which is a divisional application of U.S. application Ser. No. 14/470,832, filed Aug. 27, 2014, now U.S. Pat. No. 9,660,418, issued May 23, 2017, each of which are incorporated herein by reference in their entirety and to which applications we claim priority under 35 USC § 120.

BACKGROUND

The present invention is related to the measurement of objects. Although specific reference is made to intraoral scanning of teeth, embodiments as disclosed herein will find application in many fields such as topography and wavefront measurements.

Many dental and orthodontic procedures can benefit from accurate three-dimensional (3D) topographical measurements of a patient's intraoral cavity. For example, in the design and fabrication of dental prostheses (e.g., crowns or bridges), 3D models of the prosthesis site and surrounding dentition are typically used to ensure proper fit of the prosthesis. In many orthodontic procedures, 3D models of the patient's dental arches are utilized to design orthodontic appliances and develop treatment plans (e.g., to correct malocclusions). Various approaches can be used to produce such 3D models. For example, a physical model can be constructed from an impression of the patient's dentition. Alternatively, the intraoral cavity can be scanned to provide a virtual model suitable for use within computer-assisted design and computer-assisted manufacture (CAD/CAM) methods as well as digital treatment planning.

Scanning of the intraoral cavity may be performed by a dental or orthodontic practitioner. Previous methods and systems for scanning the intraoral cavity, however, can be less than ideal with regards to the accuracy and size of the scanning probe that is used to measure the teeth of the patient. Work in relation to embodiments suggests that the formation of light spots with such prior scanning systems can be less than ideal and may be related to measurement noise and less than ideal measurements in at least some instances. The focused spots may comprise artifacts related to the light source such as speckle, and these artifacts can affect measurement accuracy. Also, the size of the hand held probe that is positioned to measure the teeth can be somewhat larger and more difficult to position than would be ideal in at least some instances.

In light of the above, there is a need for improved methods and systems for scanning an intraoral cavity of a patient. Ideally, such systems would be more accurate and easier to manipulate than the prior scanning devices.

SUMMARY

Embodiments provide improved methods and apparatus for measuring objects. In many embodiments, a plurality of light sources generates a plurality of light beams directed toward a spot generator array comprising a plurality of spot generating lenses. The plurality of light sources is separated from the spot generator array with a separation distance sufficient to overlap the plurality of light beams at each of the spot generating lenses. The overlap of each of the beams at each of the spot generating lenses provides smoothing of the energy profile of the light energy incident on the spot generating lenses. Each of the spot generating lenses focuses the overlapping light beams to a focused spot. The focused spot of each spot generating lens comprises focused spots of a segment of the overlapping beams. In many embodiments, the focused spots of each of the overlapping beams overlap each other with sufficient overlap such that the individual focused spots of each of the beams cannot be discerned from other focused spots of the overlapping beams. The focused spots comprising the overlapping focused beams can provide decreased noise when combined with an optical measurement system such as an intraoral scanner. The overlapping beams may comprise overlapping beams of a laser diode array such as a vertical cavity surface emitting laser (VCSEL) array, and the overlapping focused beams can decrease optical artifacts of the focused spot defined with the plurality of beams. In many embodiments, each of the plurality of laser sources are not coherent with each other in order to smooth each focused spot with the plurality of focused beams.

In many embodiments, the light sources are spaced from adjacent light sources with a spacing distance and the spot generator lenses comprise a focal length. The separation distance, the spacing distance and the focal length can be arranged to provide the overlapping focused beams such that the individual focused spots of each of the beams cannot be discerned from other focused spots of the overlapping beams. This arrangement of the separation distance, the spacing distance and the focal length can be well suited for use with a laser diode array such as a vertical cavity surface emitting laser (VCSEL) array with decreased noise and coherence artifacts of generated spots.

In many embodiments, a homogenizing lens array comprising a plurality of homogenizing lenses can be located between the plurality of light sources and the spot generator array. Each lens of the homogenizing lens array can be registered with a corresponding light source such that the far field light profile from the corresponding light source is homogenized with the corresponding lens in registration with the light source. Each lens of the homogenizing array provides a substantially uniform intensity profile such as a top hat profile at the spot generator. The uniform intensity profile has the advantage of providing similar amounts of energy to each lens of the spot generator. In many embodiments, the lenses of the homogenizing array are configured to provide a homogenized far field pattern at the spot generator array. The lenses of the homogenizing array may comprise one or more of refractive optics, diffractive optics, or holographic optics to provide the homogenized beam profile for each light source. The substantially uniform beam energy profile for each light source can overlap with the substantially uniform beam energy profile with other light sources in order to provide increased uniformity to the energy profile at the spot generator and decreased coherence artifact of the focused spots.

INCORPORATION BY REFERENCE

All publications, patents, and patent applications mentioned in this specification are herein incorporated by reference in their entirety to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Methods and systems described herein provide visual guidance for a user (e.g., a dental or orthodontic practitioner) during an intraoral scanning procedure. The method and systems described herein can be combined in many ways and are well suited for combination for intraoral scanners used for measuring portions of the intraoral cavity, for example. Embodiments as described herein can be combined with one or more components of prior scanning devices. In at least some embodiments, the single point source laser of the prior scanners can be replaced with an array of vertical cavity surface emitting lasers ("VCSELs") and appropriate optics provided and configured in order to incorporate the VCSEL array.

Any of the embodiments provided herein can be combined with other embodiments to the extent that such embodiments are not inconsistent with the teachings described herein.

As used herein A and/or B encompasses A alone, B alone, and combinations of A and B.

As used herein light encompasses one or more of visible light, ultraviolet light or infrared light.

As used herein a microlens encompasses a lens having dimensions measurable in micrometers, which can be a millimeter or more.

In many embodiments, an apparatus to measure an object comprises a plurality of light sources and a plurality of spot generating lenses. The plurality of light sources can be arranged to generate a plurality of light beams. The plurality of spot generating lenses can be configured to focus the plurality of beams to a plurality of focused spots, in which each of the plurality of focused spots comprises a focused portion of each of the plurality of light beams. The focused portion of each of the plurality of beams may overlap with other focused portions of other beams in order to define said each of the plurality of focused spots and inhibit noise.

In many embodiments, the apparatus comprises a scanning confocal apparatus to measure topography of the object in response to scanning of each of the plurality of focused spots.

In many embodiments, the plurality of spot generating lenses is separated from the plurality of light sources with a separation distance, and each of the plurality of lenses comprising a focal length, and each of the plurality of light sources comprising a spacing distance from adjacent sources of the plurality of light sources. The separation distance, the focal length and the spacing distance can be arranged to overlap the focused portion of each of the plurality of beams with other focused portions of other beams near the focal length in order to inhibit noise.

In many embodiments, the plurality of light sources is arranged in a light source array and the plurality of spot generating lenses is arranged in a spot generator microlens array. The light source array and the spot generator microlens array can be arranged to provide an extended light source and inhibit Talbot artifact.

In many embodiments, one or more wavelengths of said each of the plurality of light sources overlaps with one or more wavelengths of other light sources of the plurality of light sources. Each of the plurality of light sources may comprise a full width half maximum bandwidth of wavelengths overlapping with full width half maximum of wavelengths of other light sources of the plurality of light sources. Each of the plurality of light sources may comprise a full width half maximum bandwidth of no more than about 2 nm overlapping with the full width half maximum bandwidth of said other light sources of the plurality.

In many embodiments, each of the plurality of light sources does not overlap with wavelengths of other light sources of the plurality.

In many embodiments, the apparatus further comprises a plurality of homogenizing microlenses aligned with the plurality of light sources to homogenize an energy distribution profile of said each of the plurality of light beams at the microlens array. Each of the plurality of homogenizing microlenses may comprise an optical surface shaped to homogenize the energy distribution profile, the optical surface comprising one or more of an aspheric refractive optical surface, a diffractive optical surface or a holographic optical surface. The energy distribution profile may comprise a substantially uniform energy profile comprising a maximum value and a minimum value within about 25% of a mean value of the energy profile distribution provided to the plurality of spot generating lenses. The maximum value and the minimum value can be within about 10% of the mean value of the energy profile distribution.

In many embodiments, each light source of the plurality comprises a similar polarization angle to within about 10% of other light sources of the plurality. The substantially similar polarization angle can be within about 5% of other light sources of the plurality.

In many embodiments, the apparatus comprises a detector array and circuitry coupled to the plurality of light sources and the detector array, wherein the circuitry comprises instructions to generate the plurality of light beams at predetermined time intervals.

In many embodiments a method of measuring an object comprises generating a plurality of light beams and focusing the plurality of light beams to a plurality of focused spots with a plurality of spot generating lenses. Each of the plurality of focused spots may comprise a focused portion of each of the plurality of light beams, said focused portion of each of the plurality of beams overlapping with other focused portions of other beams in order to define said each of the plurality of focused spots and inhibit noise. The plurality of spot generating lenses can be separated from the plurality of light sources with a separation distance, said each of the plurality of lenses comprising a focal length, said each of the plurality of light sources comprising a spacing distance from adjacent sources of the plurality of light sources and wherein said separation distance, said focal length and said spacing distance are arranged to overlap said focused portion of each of the plurality of beams with other focused portions of other beams near the focal length in order to inhibit noise.

In many embodiments, a light source for illuminating an optical system comprises an array of vertical cavity surface emitting lasers (VCSELs) operatively connectable to a power source and wherein the VCSELs have similar polarization.

In many embodiments the VCSELs emit similar wavelengths.

In many embodiments, the VCSELs comprise optical resonators that are not synchronized with each other.

In many embodiments, the beams comprise similar wavelengths.

In many embodiment, the array of VCSELs comprise a common die shaped to provide the array.

In many embodiments, a method comprises providing an array of vertical cavity surface emitting lasers (VCSELs) operatively connectable to a power source and wherein the VCSELs have similar polarization.

In many embodiments, a light source for illuminating an optical system comprises an array of VCSELs operatively connectable to a power source and a homogenizing lens array, comprising a plurality of homogenizing lenses, each VCSEL emitter having a respective homogenizing lens of the plurality in registry therewith.

In many embodiments, second lens array to receive a homogenized beam and form an array of focused beams.

In many embodiments, the array of VCSELs comprises single substrate and a common light emitting material in order to provide similar overlapping wavelengths for each laser of the array, and wherein each laser comprises a full width half maximum wavelength bandwidth overlapping with at least about 50% of a full width half maximum of each other laser of the array.

In many embodiments, a method comprises providing an array of VCSELs operatively connectable to a power source and providing a homogenizing lens array, in which the homogenizing array comprises a plurality of homogenizing lenses, each VCSEL emitter having a respective homogenizing lens of the plurality in registry therewith.

In many embodiments, the array of VCSELs comprises a homogenizing microlens array, which includes a dedicated homogenizing lens in registry with each of the VCSELs. In many embodiments, the result is that the aggregate extended source laser beam produced by the VCSEL array has a top-hat profile, which is of particular advantage when coupled to a second microlens array that generates the plurality of laser beams, since all the microlenses of the second microlens array receive uniform light from the laser source.

In many embodiments, The VCSEL array is arranged as a hexagonal array. The array may comprise a number of VCSELs within a range from about 30-100 VCSELs, for example.

In many embodiments, the VCSELs are not optically synchronized with one another, and thus, since each VCSEL fully illuminates all of the microlenses of the second microlens array (that generates the plurality of beams), there is natural speckle reduction.

In many embodiments, all the individual VCSELs of the array have substantially the same polarization, so that the full homogenized beam is polarized with the same polarity, thereby enabling the full beam power to be transmitted to the object being scanned, and the full reflected beam to be received by the detector via the polarized beam splitter. In many embodiments, there is no need to add a polarizer downstream of the VCSEL array which would otherwise result in losses as part of the light energy would be lost due to the polarizer, resulting in a weaker homogenized beam, or the requirement for a larger VCSEL array, which can lead to other problems or undesired design constraints.

In many embodiments, the VSCEL array comprises one or more characteristics suitable for use in combination with a confocal scanning system. In many embodiments, the array of VCSELs emitters is arranged to form an effective extended source. The array may comprise a narrow spectral bandwidth, for example about 2 nm. Each of the VSCELs can emit substantially the same wavelength, for example with a bandwidth of about 1 nm overlapping with other lasers of the array. Alternatively, each laser of the array can emit a different wavelength, for example. In many embodiments, the VCSEL array provides sufficiently intense, dense and collimated light, suitable for combination with a confocal scanning system.

In many embodiments, the VSCEL array emits visible red light, for example.

In many embodiments, the polarization ratio is about 20:1, for example.

Figure 1A:
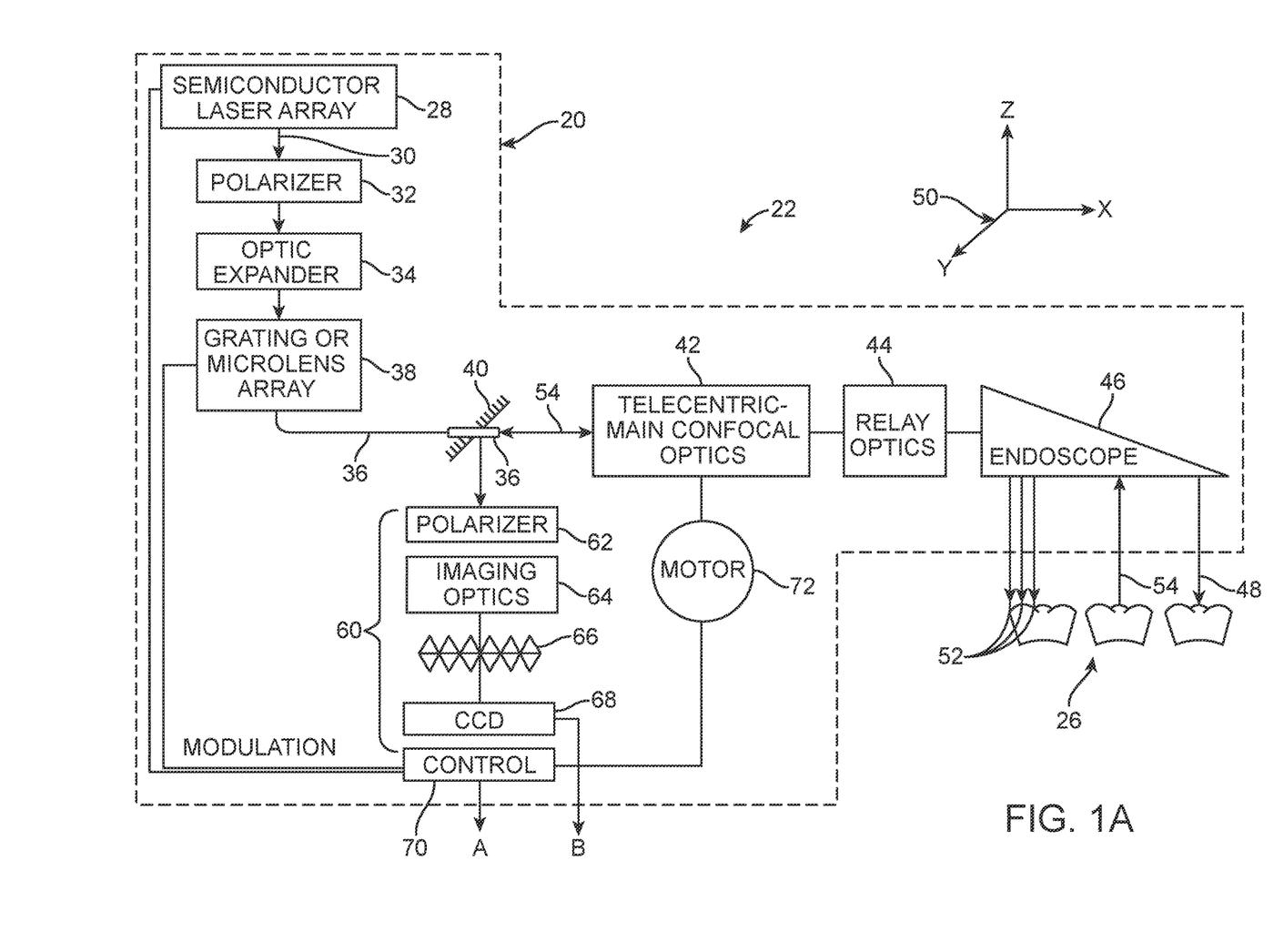
FIGS. 1A and 1B schematically illustrate, by way of a block diagram, an apparatus in accordance with many embodiments (FIG. 1B is a continuation of FIG. 1A)
Figure 1B:
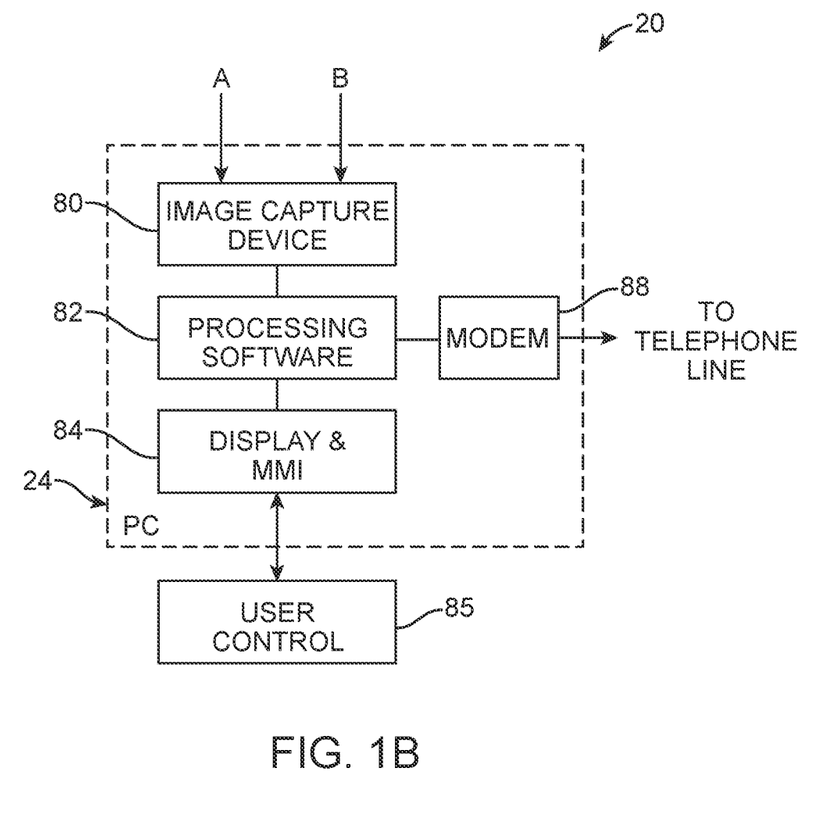

Turning now to the drawings, in which like numbers and/or words designate like elements in the various figures, FIGS. 1A and 1B illustrate an apparatus 20 for measuring surface topography optically. The apparatus 20 includes an optical device 22 coupled to a processor 24. The embodiment illustrated in FIG. 1 is particularly useful for measuring surface topography of a patient's teeth 26. For example, the apparatus 20 can be used to measure surface topography of a portion of the patient's teeth where at least one tooth or portion of tooth is missing to generate surface topography data for subsequent use in design and/or manufacture of a prosthesis for the patient (e.g., a crown or a bridge). It should be noted, however, that the invention is not limited to measuring surface topography of teeth, and applies, mutatis mutandis, also to a variety of other applications of imaging of three-dimensional structure of objects (e.g., for the recordal of archeological objects, for imaging of a three-dimensional structure of any suitable item such as a biological tissue, etc.).

The optical device 22 includes, in the illustrated embodiment, a semiconductor laser array unit 28 emitting a laser light, as represented by arrow 30. The light passes through a polarizer 32, which causes the light passing through the polarizer 32 to have a certain polarization. The light then enters into an optic expander 34, which increases the diameter of the light beam 30. The light beam 30 then passes through a module 38, which can, for example, be a grating or a micro lens array that splits the parent beam 30 into a plurality of light beams 36, represented here, for ease of illustration, by a single line.

The optical device 22 further includes a partially transparent mirror 40 having a small central aperture. The mirror 40 allows transfer of light from the laser array unit 28 through the downstream optics, but reflects light travelling in the opposite direction. It should be noted that in principle, rather than a partially transparent mirror, other optical components with a similar function may be used (e.g., a beam splitter). The aperture in the mirror 40 improves the measurement accuracy of the apparatus. As a result of this mirror structure, the light beams produce a light annulus on the illuminated area of the imaged object as long as the area is not in focus. The annulus becomes a sharply-focused illuminated spot when the light beam is in focus relative to the imaged object. Accordingly, a difference between the measured intensity when out-of-focus and in-focus is larger. Another advantage of a mirror of this kind, as opposed to a beam splitter, is that internal reflections that occur in a beam splitter are avoided, and hence the signal-to-noise ratio is greater.

The optical device 22 further includes confocal optics 42, typically operating in a telecentric mode, relay optics 44, and an endoscopic probe member 46. In many embodiments, the confocal optics 42 is configured to avoid distance-introduced magnification changes and maintain the same magnification of the image over a wide range of distances in the Z direction (the Z direction being the direction of beam propagation). In many embodiments, the relay optics 44 is configured to maintain a certain numerical aperture of the light beam's propagation.

The endoscopic probe member 46 can include a light-transmitting medium, which can be a hollow object defining within it a light transmission path or an object made of a light transmitting material (e.g., a glass body or tube). The light-transmitting medium may be rigid or flexible (e.g., fiber optics). In many embodiments, the endoscopic probe member 46 includes a mirror 95 of the kind ensuring a total internal reflection and directing the incident light beams towards the patient's teeth 26. The endoscope 46 thus emits a plurality of incident light beams 48 impinging on to the surface of the patient's teeth 26.

In many embodiments, the distance between the endoscopic probe member 46 and the patient's teeth 26 is determined by measuring one or more characteristics of returning light beams 54 generated by illuminating the teeth 26 with the incident light beams 48. Such characteristics can include, for example, intensity, wavelength, polarization, phase shift, interference, and/or dispersion of the returning light beams 54. Any description herein relating to light intensity can also be applied to other suitable characteristics of light, and vice-versa. The measurements of the characteristic(s) can be used to detect whether the incident light beams 46 are focused on the surface of the teeth 26 and thereby determine the distance between the endoscopic probe member 46 and the teeth 26.

For example, as depicted in FIGS. 1A and 1B, the distance can be determined based on measured light intensities. The incident light beams 48 form an array of light beams arranged in an X-Y plane, relative to a Cartesian reference frame 50, and propagating along the Z axis. When the incident light beams 48 are incident upon an uneven surface, resulting illuminated spots 52 are displaced from one another along the Z axis, at different $(X_i, Y_i)$ locations. Thus, while an illuminated spot 52 at one location may be in focus for a given focal length produced by the confocal optics 42, illuminated spots 52 at other locations may be out-of-focus. Therefore, the light intensity of the returned light beams of the focused spots will be at its peak, while the light intensity at other spots will be off peak. Thus, for each illuminated spot, a plurality of measurements of light intensity are made at different positions along the Z-axis and for each of such $(X_i, Y_i)$ locations, typically the derivative of the intensity over distance (Z) will be made, and the $Z_i$ yielding maximum derivative, $Z_0$, will be the in-focus distance. As pointed out above, where, as a result of use of the mirror with aperture 40, the incident light forms a light disk on the surface when out of focus and a sharply-focused light spot only when in focus, the distance derivative will be larger when approaching in-focus position thus increasing accuracy of the measurement.

The light reflected from each of the illuminated spots 52 includes a beam travelling initially in the Z axis in the opposite direction of the optical path traveled by the incident light beams. Each returned light beam 54 corresponds to one of the incident light beams 36. Given the unsymmetrical properties of mirror 40, the returned light beams 54 are reflected in the direction of a detection assembly 60. The detection assembly 60 includes a polarizer 62 that has a plane of preferred polarization oriented normal to the polarization plane of polarizer 32. The returned polarized light beam 54 pass through an imaging optic 64, typically a lens or a plurality of lenses, and then optionally through an array of pinholes 66. Each returned light beam 54 may pass at least partially through a respective pinhole of the array of pinholes 66. A charge-coupled device (CCD) sensor array 68 includes a matrix of sensing elements. In many embodiments, each sensing element represents a pixel of the image and each sensing element corresponds to one pinhole in the array 66.

The sensor array 68 is connected to an image-capturing module 80 of the processor unit 24. The light intensity measured by each of the sensing elements of the sensor array 68 is analyzed, in a manner described below, by the processor 24.

The optical device 22 includes a control module 70 that controls operation of the semi-conducting laser 28. The control module 70 can be used in conjunction with any suitable mechanism or configuration for controlling the focal positions of the incident light beams 36. For example, in many embodiments, a motor 72 is drivingly coupled with the confocal optics 42 so as to scan the focus of the light beams through a range of focal depths along the Z axis. In a single sequence of operation, the control unit 70 induces motor 72 to reconfigure the confocal optics 42 to change the focal plane location and then, after receipt of a feedback that the location has changed, the control module 70 induces the laser 28 to generate a light pulse. The control module 70 synchronizes the operation of the image-capturing module 80 with the operation of the confocal optics 42 and the laser 28 during acquisition of data representative of the light intensity from each of the sensing elements. Then, in subsequent sequences, the confocal optics 42 causes the focal plane to change in the same manner and intensity data acquisition continues over a range of focal lengths.

The intensity data is processed by the processor 24 per processing software 82 to determine relative intensity in each pixel over the entire range of focal planes of confocal optics 42. As explained above, once a certain light spot is in focus on the three-dimensional structure being measured, the measured intensity of the returning light beam will be maximal. Thus, by determining the $Z_i$ corresponding to the maximal light intensity or by determining the minimum derivative of the light intensity, for each pixel, the relative in-focus focal length along the Z axis can be determined for each light beam. Thus, data representative of the three-dimensional topography of the external surfaces of the teeth is obtained. A resulting three-dimensional representation can be displayed on a display 84 and manipulated for viewing (e.g., viewing from different angles, zooming-in or out) by a user control module 85 (typically a computer keyboard). In addition, the data representative of the surface topology can be transmitted through an appropriate data port such as, for example, a modem 88 or any suitable communication network (e.g., a telephone network) to a recipient (e.g., to an off-site CAD/CAM apparatus).

By capturing, in this manner, relative distance data between the probe and the structure being measured from two or more angular locations around the structure (e.g., in the case of a teeth segment, from the buccal direction, lingual direction and/or optionally from above the teeth), an accurate three-dimensional representation of the structure can be generated. The three-dimensional data and/or the resulting three-dimensional representation can be used to create a virtual model of the three-dimensional structure in a computerized environment and/or a physical model fabricated in any suitable fashion (e.g., via a computer controlled milling machine, a rapid prototyping apparatus such as a stereo lithography apparatus).

As already pointed out above, a particular and preferred application is imaging of a segment of teeth having at least one missing tooth or a portion of a tooth. The resulting three-dimensional surface topography data can, for example, be used for the design and subsequent manufacture of a crown or any other prosthesis to be fitted into this segment.

Figure 2A:
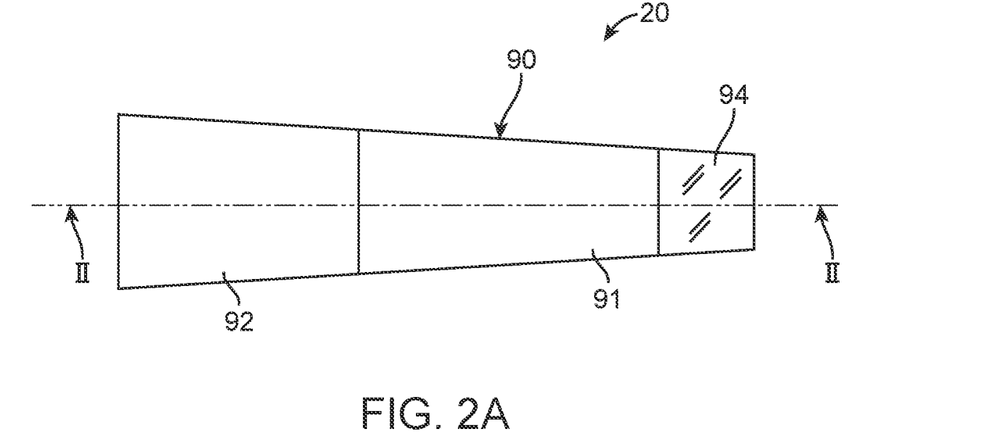
FIG. 2A illustrates a top view of a probing member in accordance with many embodiments.
Figure 2B:
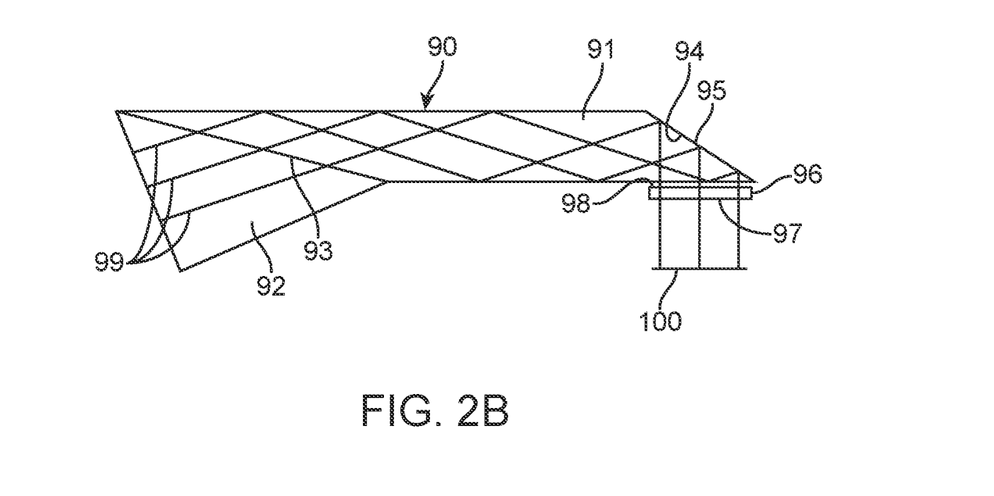
FIG. 2B illustrates a longitudinal cross-section through the probing member of FIG. 2A, depicting exemplary rays passing therethrough.

Referring now to FIGS. 2A and 2B, a probing member 90 is illustrated in accordance with many embodiments. The probing member 90 can be made of a light transmissive material (e.g., glass, crystal, plastic, etc.) and includes a distal segment 91 and a proximal segment 92, tightly glued together in an optically transmissive manner at 93. A slanted face 94 is covered by a reflective mirror layer 95. A transparent disk 96 (e.g., made of glass, crystal, plastic, or any other transparent defining a sensing surface 97 is disposed along the optical path distal to the mirror layer 95 so as to leave an air gap 98 between the glass disk 96 and the distal segment 91. The transparent disk 96 is fixed in position by a holding structure (not shown). Three light rays 99 are represented schematically. As can be seen, the light rays 99 reflect from the walls of the probing member 90 at an angle in which the walls are totally reflective, reflect from the mirror layer 95, and then propagate through the sensing face 97. The light rays 99 are focused on a focusing plane 100, the position of which can be changed by the confocal optics 42.

Figure 3:
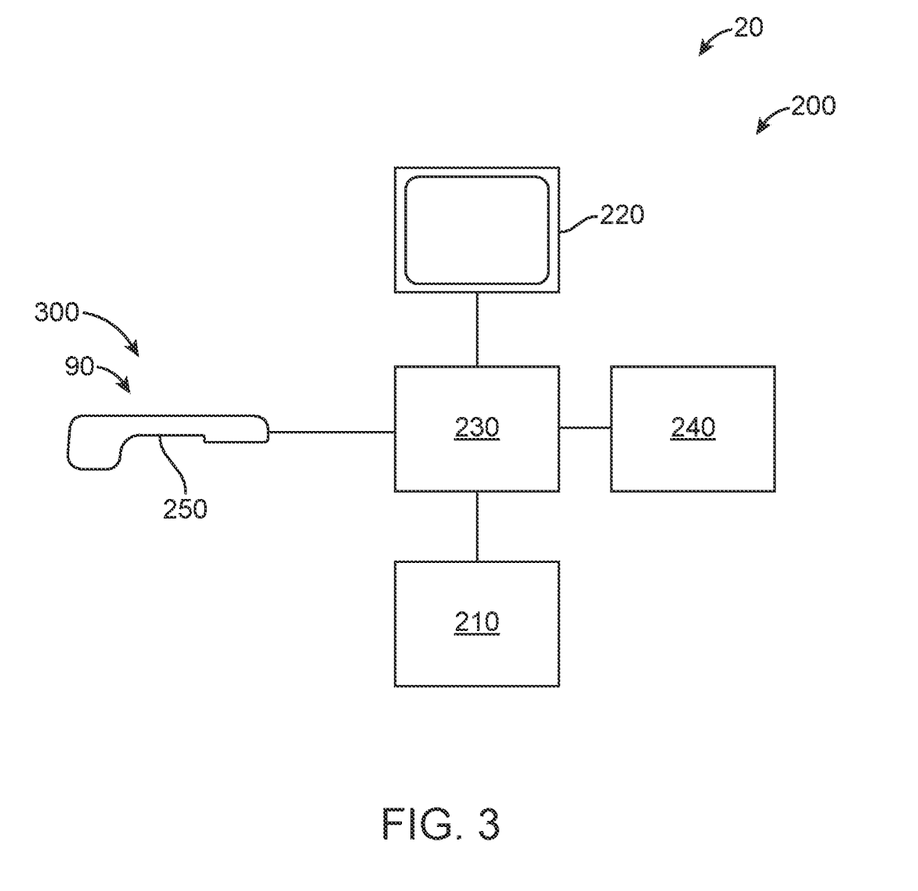
FIG. 3 illustrates a system for scanning an intraoral cavity, in accordance with many embodiments.

FIG. 3 illustrates the main elements of a system 200 for scanning an intraoral cavity, in accordance with many embodiments. The system 200 includes an input unit 210 (e.g., a keyboard, mouse, joystick, tablet, or touch screen), a display or output module 220 (e.g. a screen, monitor, or printer), a processing unit 230 (e.g., comprising one or more processors such as a CPU), and a memory 240. A handheld scanner 250 (e.g., an intraoral scanner) is operatively connected to the system 200. Any suitable scanning system or device for obtaining 3D topographical scans of the intraoral cavity can be used for the scanner 250, such as the optical device 22 and/or the optical system 300 (see FIG. 4). For example, the scanner 250 can be a "point-and-shoot" scanner configured such that each scan event is initiated by a specific user input command (e.g., a button press, mouse click, etc). In such embodiments, each scan can be performed while the scanner 250 is held stationary at a desired position and orientation. As another example, the scanner 250 can be a "continuous scanner" configured to continuously obtain scan data without requiring user input to specifically initiate each scan (e.g., based on control signals produced by the processing unit 230). In such embodiments, scanning can be performed continuously or at predetermined time intervals as the scanner 250 moves through a plurality of positions and orientations relative to the intraoral cavity. Scan data collected by the scanner 250 can be processed by the processing unit 230 to reconstruct the surface topography of the intraoral cavity, thereby generating a 3D digital model of the intraoral cavity. The surface topography data can be presented to the user (e.g., as a 3D graphical representation on the display 220) and/or stored for subsequent applications (e.g., in the memory 240).

In many embodiments, the intraoral scanning systems provided herein include a viewfinder that provides two-dimensional image data of the intraoral cavity corresponding to the field of view of the scanner. In many embodiments, the viewfinder and scanner are optically aligned such that the field of view of the viewfinder is the same or similar to the field of view of the scanner. The viewfinder images can be displayed to a user in order to guide the scanning procedure and can be updated as the scanner moves to reflect changes in the scanner's field of view. Accordingly, the user can adjust the position and orientation of the scanner based on the displayed viewfinder images in order to ensure satisfactory scanning coverage of the targeted portion of the intraoral cavity.

The approaches provided herein can be used with any suitable scanner and viewfinder system. The viewfinder can include any suitable imaging device operable to provide images corresponding to the field of view of the scanner, such as a camera suitable for capturing monochromatic or color image data. For example, the viewfinder images may represent the field of view of the scanner, e.g., in terms of viewing angle, coverage area, etc. The viewfinder field of view may be similar to or larger than the scanner field of view, such that the viewfinder images represent the entirety of the field of view of the scanner. Alternatively, the viewfinder field of view may be smaller than or partially overlapping with the scanner field of view, such that the viewfinder images represent a subset of the field of view of the scanner. In many embodiments, the viewfinder is adapted to record image data in real time, such that the viewfinder images are continuously displayed and updated as the scanner is moved. For example, the viewfinder can include a camera with a suitable video capture rate for real-time display. Alternatively, the viewfinder can record image data at a video capture rate different than the video display rate.

Figure 4:
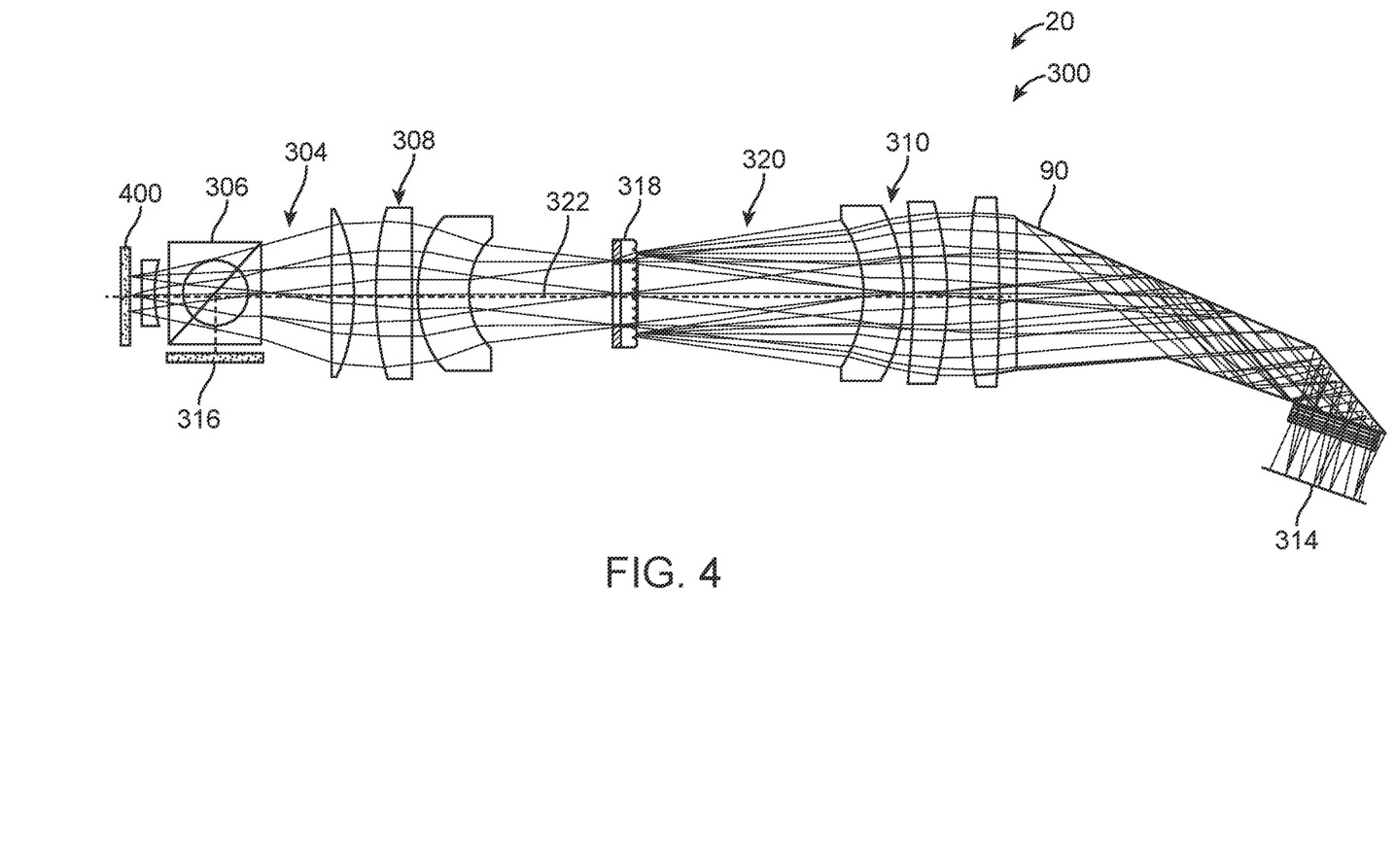
FIG. 4 illustrates an optical system with aligned scanner and viewfinder optics, in accordance with many embodiments.

FIG. 4 illustrates an optical system 300 with aligned scanner and viewfinder optics, in accordance with many embodiments. At least some of the elements of the optical system 300 can be combined with the other systems and devices described herein, such as the apparatus 20 and/or the system 200. In many embodiments, at least some of the components of the optical system 300 form part of an intraoral scanning device, such as the handheld scanner 250. In the system 300, the components of the scanner and viewfinder are integrated into a single device, such at least some portions of the optical path of the scanner overlap with the optical path of the viewfinder and at least some optical components of the system 300 are shared between the scanner and viewfinder. The system 300 comprises spot generator 400 that produces a two-dimensional array of light beams 304 (e.g., an array of laser beams) for surface topography scanning. The array of light beams 304 can propagate through a polarizing beam splitter 306, a first set of lens elements 308, a second set of lens elements 310, and a probing member 90 so as to illuminate the surface of a targeted object with a two-dimensional array of light spots. In many embodiments, the array of light beams 304 is focused to a focal plane 314 external to the probing member 90. Light beams reflected from the surface can pass back through the probing member 90 and lens elements 308, 310 and are directed by the beam splitter 306 onto an detector unit 316 (e.g., sensor array 68). The detector unit 316 can include a plurality of sensor elements used to measure characteristics of the returning light (e.g., light intensity) in order to determine the surface topography, as previously described herein.

The system 300 also includes a viewfinder illumination unit 318 that provides a plurality of light beams 320 for generating viewfinder image data. For example, the viewfinder illumination unit 318 can include a plurality of LEDs. The LEDs can be arranged in a ring configuration, with the central aperture of the ring sized to permit light beams of the array 304 and returning light beams from the object surface to pass through. The light beams 320 produced by the viewfinder illumination unit 318 can propagate through the second set of lens elements 310 and the probing member 90 to illuminate the object surface. Light reflected from the surface can pass back through the optics and onto the sensor elements of the detector unit 316, as described above. The sensor data can subsequently be processed using techniques known to those of skill in the art to provide viewfinder images. Notably, the system 300 can utilize a single detector unit 316 to generate scan data and viewfinder image data, rather than having separate detector units for scanning and image capture. In many embodiments, the scanner and viewfinder optics are optically aligned so as to share a common optical axis 322, such that the field of view of the scanner is the same or similar to the field of view of the viewfinder and the viewfinder images provided by the viewfinder correspond to the field of view of the scanner.

In many embodiments, the system 300 can utilize a single detector unit 316 to generate scan data and viewfinder image data, rather than having separate detector units for topography scanning and image capture. Alternatively, the system 300 may comprise separate detectors for generating scanning data from the array of light beams 304 and for generating viewfinder image data, in which the scanner and viewfinder optical axes are optically aligned, for example.

The viewfinder illumination unit 318 can be adapted to provide monochromatic or polychromatic illumination (e.g., via colored LEDs). In many embodiments, the illumination unit 318 sequentially illuminates the targeted object with different wavelengths (e.g., red, green, and blue wavelengths) and the detector unit 316 obtains a monochromatic image corresponding to each wavelength. The different monochromatic images can be subsequently be processed and merged to provide a composite color image of the object. Optionally, the system 300 can include chromatic dispersion optics along the optical path between the illumination unit 318 and the imaged object, such that each wavelength of light is focused to a different focal depth. Accordingly, the focused and unfocused areas of each monochromatic image may differ based on the particular illumination wavelength used. Suitable image processing algorithms can be used to identify the focused areas of each image in order to increase the clarity and precision of the final composite image.

An intraoral scanning procedure may involve capturing topographical scan data of multiple portions of the patient's intraoral cavity. As previously described, the user can view the image data provided by the viewfinder (e.g., via a graphical interface provided on a display, as described in greater detail below) in order to determine which portions of the intraoral cavity are included in the current field of view of the scanner. Furthermore, suitable guidance mechanisms can be implemented to indicate to the user which portions of the cavity have already been scanned in order to improve scanning efficiency and reduce unnecessary rescanning. These guidance mechanisms can include visual indicators provided on a display (e.g., as an overlay on top of the current viewfinder image) that permit the user to rapidly and accurately assess whether the current field of view is situated at an appropriate location relative to the areas of previous scan coverage. The user can then position and orient the field of view of the scanner accordingly so as to scan targeted portions of the intraoral cavity while reducing the overlap with previously scanned areas. In many embodiments, the visual indicators can be updated or adjusted according to the scanning progress and scanner movement, thereby providing real-time or near real-time scanning guidance.

Figure 5:
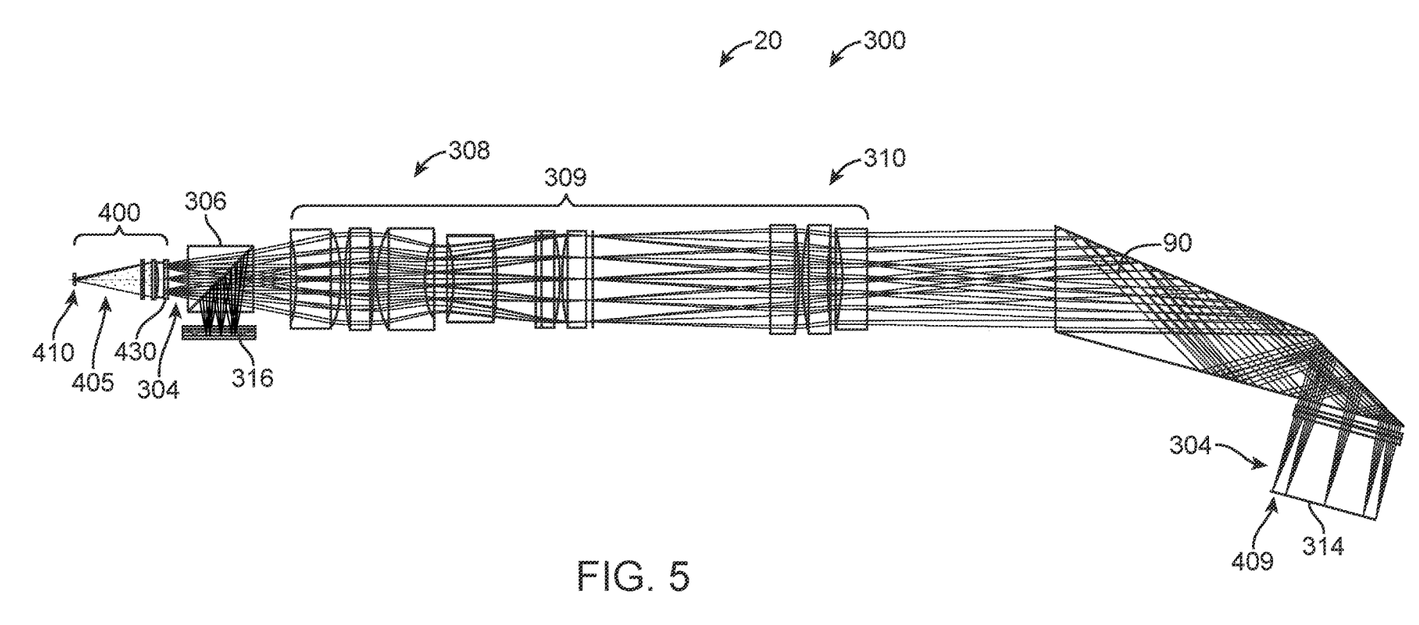
FIG. 5 shows an optical system comprising a spot generator in accordance with many embodiments.

FIG. 5 shows optical system 300 comprising a spot generator 400 comprising a VCSEL array 410. The VCSEL array generates a plurality of light beams. The plurality of light beams 405 from the VCSEL array travel a distance such that the plurality of beams overlap. The plurality of overlapping light beam 405 can illuminate a spot generator 400. In many embodiments, the spot generator 400 comprises a microlens array 430 to generate light beams 304 from the overlapping light beams incident on the microlens array. The light beams 304 are directed to the beam splitter 306 and focusing optics 309 comprising lens elements 308 and lens elements 310 as described herein. The light beams 304 are received with probe 90 to measure the surface as described herein.

In many embodiments, the plurality of light beams 304 is focused to a plurality of spots 409 along focal surface such as focal plane 314. Each of the plurality of spots 409 comprises light from a plurality of light sources in order to smooth the energy profile of the spot and decrease noise.

Figure 6:
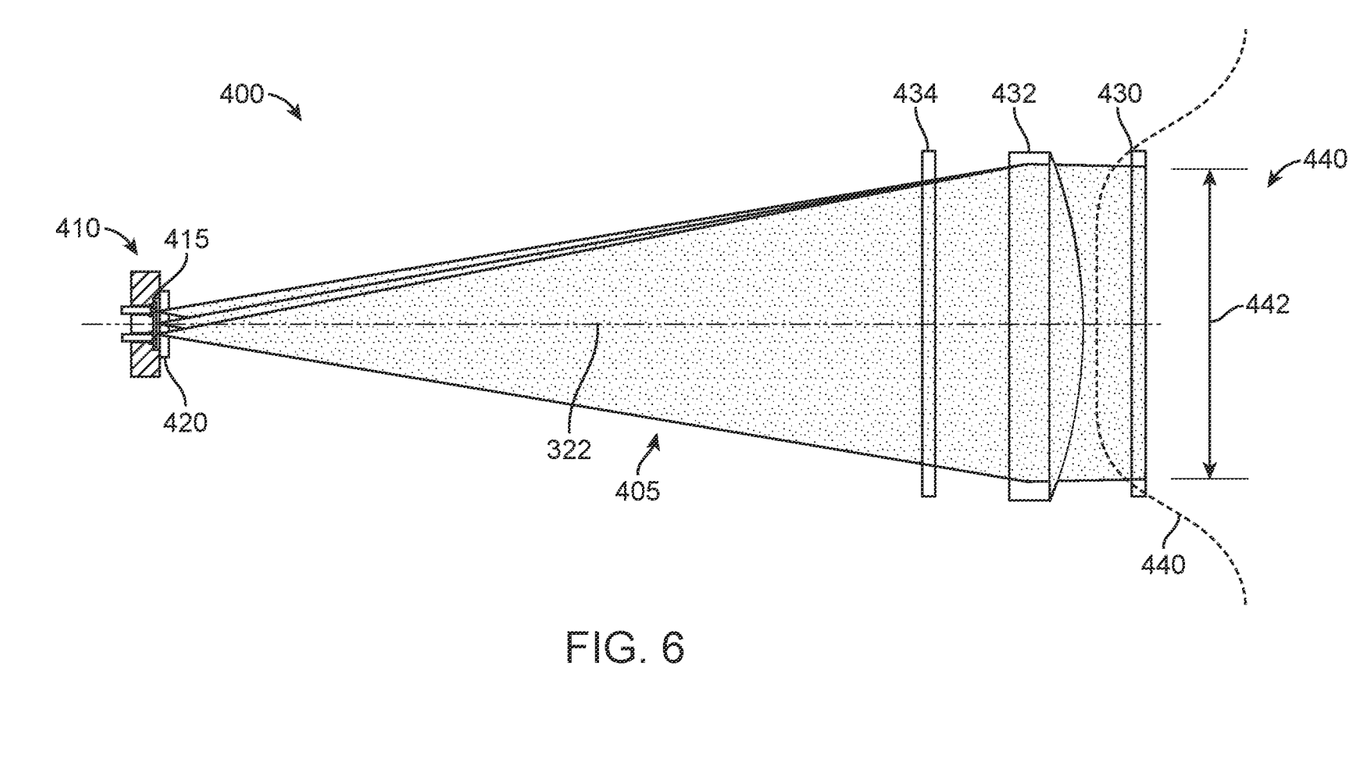
FIG. 6 shows components of a spot generator as in FIG. 5.

FIG. 6 shows components of spot generator 400 as in FIG. 5. The spot generator 400 may comprise a microlens array 420, a preferably low attenuation linear polarizer 434, a collimating lens 432, in combination with the VCSEL array 410 and spot generating microlens array 430, for example. The VCSEL array 410 comprises a plurality of light sources distributed in relation to optical axis 322. The VCSEL array 410 comprises an emitting surface 415 from which the light beams are emitted. The VCSEL microlens array is located in close proximity to the VCSEL emitting surface 415. The plurality of light beams from the microlens array 420 can be directed toward a low attenuation polarizing beam splitter 434. The microlens array 420 can be spaced from the microlens array 430 with a sufficient distance such that a far field diffraction pattern of each lens of the VCSEL microlens array 420 is provided to the microlens array 430. In many embodiments, the far field diffraction pattern of the overlapping beams 405 provides a homogenized intensity profile distribution 440 at the microlens array 430.

The collimating lens 432 can be spaced apart from the VCSEL emitting surface 415 with a distance approximately equal to a focal length of the lens 432 such that the lens 432 substantially collimates light received from the VCSEL array.

In many embodiments, each of the lasers of the VCSEL array is similarly polarized with the other lasers of the array such that the low attenuation linear polarizer may not be beneficial. In some embodiments, the low attenuation linear polarizer 434 can be rotated to set an output energy of the spot generator 400, for example.

The spot generating microlens array 430 defines an aperture window 440 having a dimension across 440 sized for components of optical system 300 such as focusing optics 309, probe 90 and detector unit 316 comprising an image sensor array.

Figure 7:
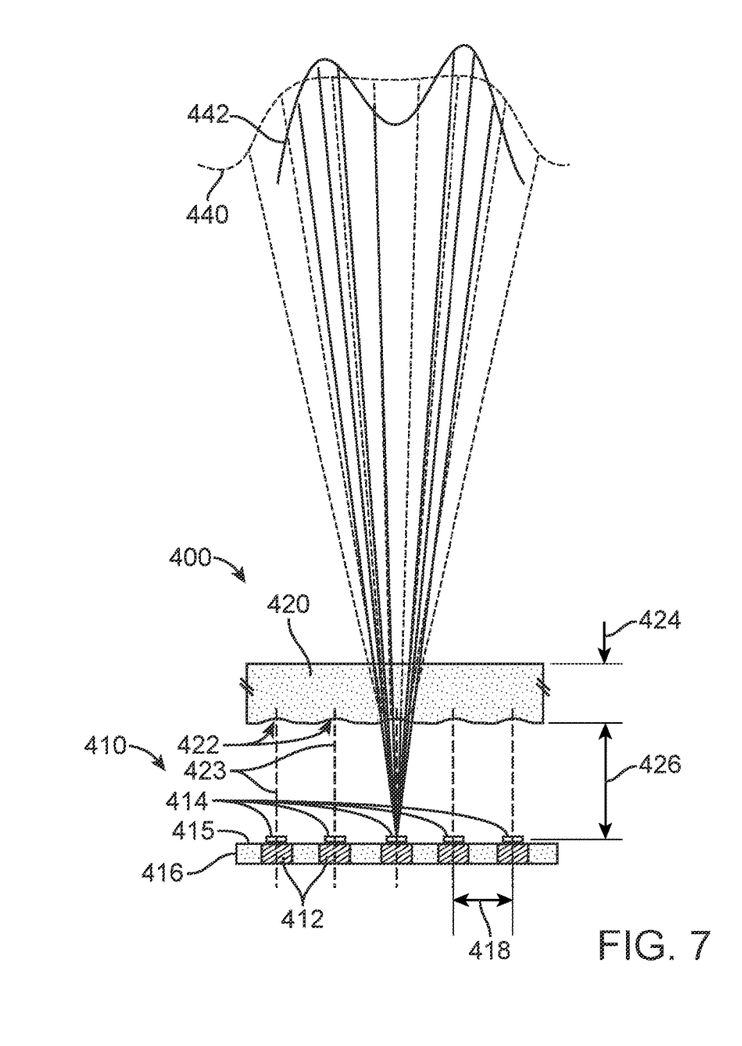
FIG. 7 shows a side view of a VCSEL array and microlens array to produce a homogenized far field energy distribution profile, in accordance with many embodiments.

FIG. 7 shows a side view of VCSEL array 410 and microlens array 420 to produce a homogenized far field energy distribution profile 440 (not to scale). The VCSEL array 410 comprises a plurality of vertical cavity surface emitting lasers 412. The plurality of lasers 412 comprise a common VCSEL die 416. The plurality of lasers 412 are spaced at regular distances 418 along the die 416.

The homogenizing microlens array 420 comprises a plurality of lenses 422 spaced at regular distances corresponding to distances 418 of the plurality of lasers 412. A plurality of optical axes 423 can extend between the plurality of lasers 412 and the plurality of lenses 422 such that the plurality of lenses are aligned with the plurality of lasers. In many embodiments, each laser of the VCSEL array 410 is aligned with a corresponding lens of the lens array 420. In many embodiments, a center of an aperture of the laser is aligned with a center of the corresponding lens for each laser and lens of the plurality of lasers and lenses. The registration of the microlens array 420 with the VSCEL array 410 allows the laser beams to be overlapped with and provide a uniform energy profile at the spot generator array 430, which may comprise a top hat energy profile.

The homogenizing microlens array 420 can be configured in one or more of many ways to provide the homogenized energy profile. The lenses 422 of the microlens array 420 may comprise lenses having an optical surface shape profile such as an aspheric shape profile in order to provide the homogenized energy distribution profile. Alternatively or in combination, the lenses 422 may comprise diffractive optical surfaces or holographic optical elements, and combinations thereof, for example. Each of the lenses of the array may comprise a concave aspheric profile to provide a substantially uniform intensity pattern with a divergent beam at the collimating lens. In many embodiments the homogenizing microlens array 420 comprises a thickness 424 sufficient to support to the lens array. For illustration purposes in accordance with some embodiments, the far field diffraction profile may comprise a non-uniform energy profile 442.

In many embodiments, the homogenizing microlens array 420 is separated from the spot generator lens array 430 with a distance sufficient to develop a far field diffraction pattern of the plurality of lenses 422 of the array 420 at the spot generating microlens array 430.

The VCEL array 420 can connected to circuitry configured to drive the array in one or more of many ways. For example, the lasers of the array 420 can be connected in parallel so as to turn the lasers on and off together in response to signals from the controller as described herein.

Figure 8A:
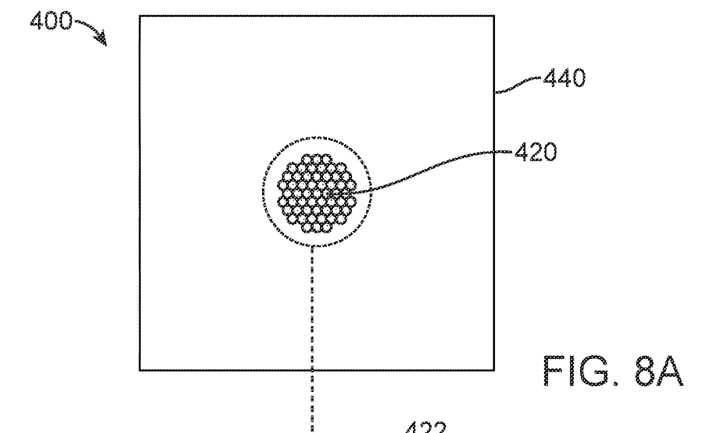
FIG. 8A shows top view of the VCSEL array and microlens array of FIG. 7.

FIG. 8A shows top view of the VCSEL array 410 and microlens array 420 of FIG. 7. The microlens array 420 may comprise a hexagonal array of lenses, although the lenses of the array can be arranged in any configuration suitable for use in accordance with embodiments disclosed herein. The VCSEL array 410 is shown through the window 440 of the microlens array 420.

Figure 8B:
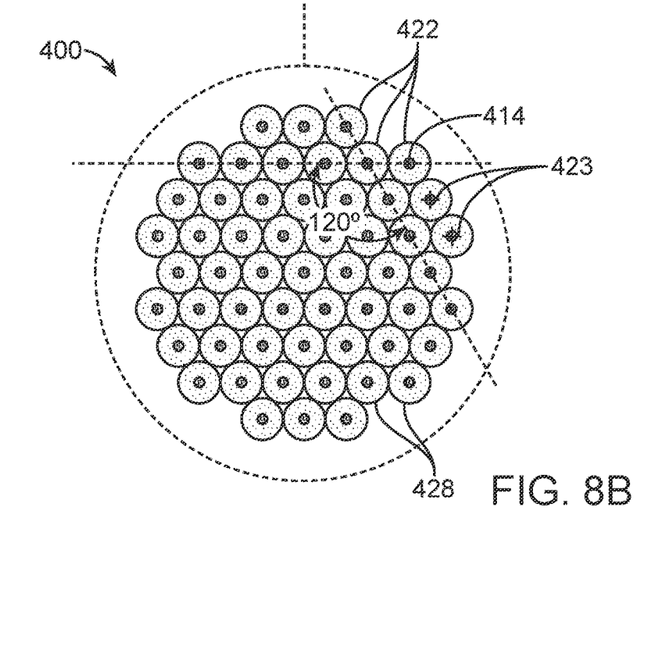
FIG. 8B shows an enlarged top view of the VCSEL array and microlens array of FIGS. 7 and 8A.

FIG. 8B shows an enlarged top view of the VCSEL array 410 and microlens array 420 of FIGS. 7 and 8A. The lenses of the microlens array 420 are shown in registration with the lasers of the VCSEL array 410 along axes 423. The plurality of lenses 422 and the plurality of lasers 412 are arranged along corresponding rows. The axes 423 can be arranged along a plurality of rows. The rows can intersect each other at angles such as 120 degrees, for example.

In many embodiments, the VCSEL array 410 is arranged with one or more components of the optical system such as the spot generator array 430, so as to comprise an extended source for each of the measurement beams 304. The extended source can inhibit Talbot artifact and speckle and provide a smoothed energy distribution profile for each of the measurement beams 304.

Figure 9:
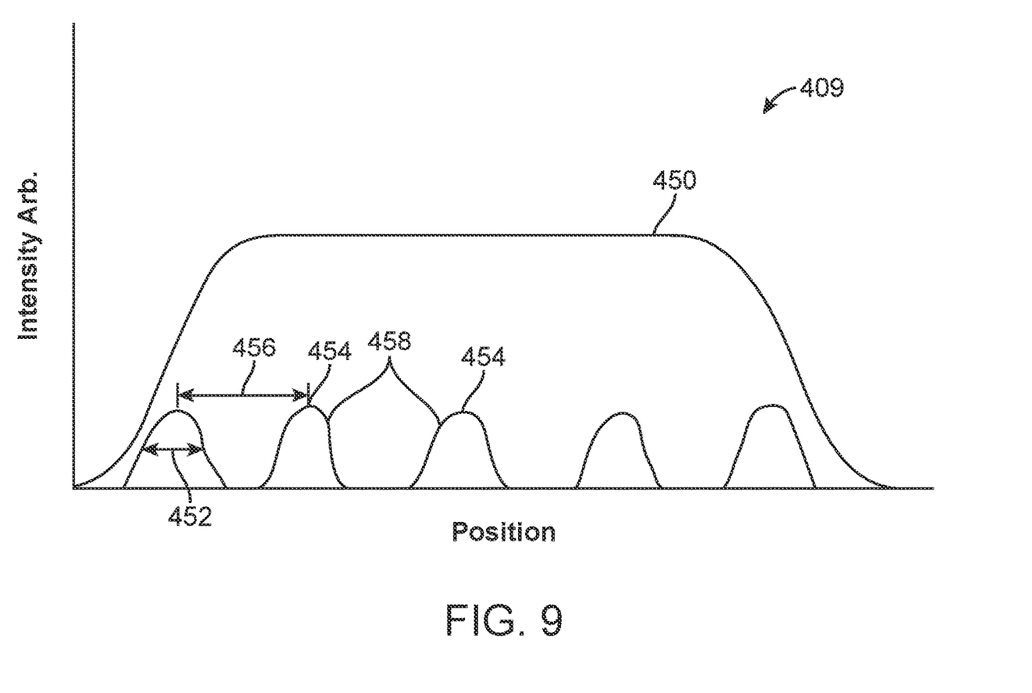
FIG. 9 shows an energy profile of a focused spot of a measurement beam, in accordance with embodiments.

FIG. 9 shows near field and far field energy profiles. In the near field, for example very close to the VCSEL emitters (e.g. a few micrometers), the illumination profiles 458 of the individual emitters do not overlap. At a distance from the VCSEL emitting plane the beams begin to overlap, and the initial overlap can occur a few hundred micrometers from the VCSEL emitter plane. In many embodiments, the far field profiles at distances greater than a few hundred micrometers from the emitter plane comprise substantial overlap such that the individual spots are not readily discernable with the far field overlapped energy profile 450.

The spacing distance 418 of the lasers and the distance from the VSCEL array 410 to the spot generator array 430 can be arranged to substantially overlap the plurality of spots 458 and provide smooth overlapped energy profile 450. The spacing distance 418 corresponds to the separation distance 456 between peaks 454 of the spots close to the array. In many embodiments, the spots comprise substantial overlap such that the spots cannot be resolved from each other when provided together to form profile 450. Each of the spots 458 may comprise a peak 454 and a full width half maximum distance 452 across. In the near field close to the VCSEL emitter plane, the peaks 454 of the spots 458 can be separated by a distance 456 greater than the full width half maximum distance 452, such that the spots are discernible from each other. However, in the far field the full width half maximum of the individual spots is much greater than the separation distance of the emitters such that the individual beams cannot be discerned.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for scanning an intraoral cavity, comprising:
an intraoral scanner to generate intraoral scan data of the intraoral cavity and viewfinder images of the intraoral cavity;
a display; and
a processing unit operatively connected to the intraoral scanner and to the display, the processing unit to:

receive the intraoral scan data and the viewfinder images from the intraoral scanner;
generate a three-dimensional (3D) digital model of the intraoral cavity using the intraoral scan data;
output the 3D digital model to the display;
output the viewfinder images to the display;
determine which portions of the intraoral cavity have been scanned based on at least one of the intraoral scan data or the viewfinder images;
determine a current field of view of the intraoral scanner based on at least one of the intraoral scan data or the viewfinder images;
generate a visual indicator that provides guidance for positioning and orienting the field of view of the intraoral scanner; and
output the visual indicator to the display.

2. The system of claim 1, wherein the intraoral scanner comprises:
an optical system with aligned scanner optics and viewfinder optics, wherein the scanner optics have a first optical path, wherein the viewfinder optics have a second optical path, and wherein at least a portion of the second optical path overlaps with the first optical path.

3. The system of claim 2, wherein the optical system comprises a plurality of optical components, and wherein at least some of the plurality of optical components are shared between the scanner optics and the viewfinder optics.

4. The system of claim 1, wherein the intraoral scanner comprises:
a first illumination unit configured to generate first light for generating the intraoral scan data; and
a second illumination unit configured to generate second light for generating the viewfinder images.

5. The system of claim 4, wherein the first illumination unit comprises one or more lasers.

6. The system of claim 5, wherein the one or more lasers comprise a vertical cavity surface emitting laser (VCSEL) array.

7. The system of claim 6, wherein the intraoral scanner further comprises a homogenizing lens array comprising a plurality of homogenizing lenses, each emitter of the VCSEL array having a respective homogenizing lens of the plurality of homogenizing lenses in registry therewith.

8. The system of claim 7, wherein the intraoral scanner further comprises a spot generator lens array, wherein the homogenizing lens array and the VCSEL array are configured to generate a far field homogenized pattern of overlapping light beams at the spot generator lens array.

9. The system of claim 4, wherein the second illumination unit is configured to provide polychromatic illumination.

10. The system of claim 9, wherein the second light comprises a plurality of different wavelengths, and wherein the intraoral scanner comprises chromatic dispersion optics along an optical path between the second illumination unit and the intraoral cavity, such that each wavelength of the second light is focused to a different focal depth.

11. The system of claim 4, wherein:
the second illumination unit is configured to sequentially illuminate the intraoral cavity with different wavelengths of light;
a detector unit of the intraoral scanner is to obtain monochromatic images corresponding to each of the different wavelengths of light; and the processing unit is to process and merge the monochromatic images corresponding to each of the different wavelengths of light to provide a composite color viewfinder image.

12. The system of claim 11, wherein focused and unfocused areas of each of the monochromatic images differs based on an associated wavelength of light captured in the respective monochromatic images, and wherein the processing unit is further to process each of the monochromatic images to identify focused areas therein.

13. The system of claim 1, wherein the processing unit is to update the visual indicator according to scanning progress and intraoral scanner movement in a manner that provides real-time or near real-time scanning guidance.

14. The system of claim 1, the intraoral scanner comprising a detector unit that is to generate both the intraoral scan data and the viewfinder images.

15. The system of claim 1, wherein the current field of view of the intraoral scanner is determined based on at least one of most recent intraoral scan data from the intraoral scan data or a most recent viewfinder image from the viewfinder images.

16. The system of claim 1, wherein the processing unit is further to determine the visual indicator based on at least one of the current field of view or the determined portions of the intraoral scanner that have been scanned.

17. A computer readable storage medium comprising instructions that, when executed by a processing unit of a system for scanning intraoral cavities, causes the processing unit to perform operations comprising:
receiving intraoral scan data and viewfinder images of an intraoral object from an intraoral scanner;
generating a three-dimensional (3D) digital model of the intraoral object using the intraoral scan data;
outputting the 3D digital model to a display;
outputting the viewfinder images to the display;
determining which portions of the intraoral object have been scanned based on at least one of the intraoral scan data or the viewfinder images;
determining a current field of view of the intraoral scanner based on at least one of the intraoral scan data or the viewfinder images;
generating a visual indicator that provides guidance for positioning and orienting the field of view of the intraoral scanner; and
outputting the visual indicator to the display.

18. The computer readable storage medium of claim 17, the operations further comprising:
receiving a plurality of monochromatic images from the intraoral scanner, each of the plurality of monochromatic images corresponding to a different wavelength of light emitted by an illumination unit of the intraoral scanner; and
processing and merging the plurality of monochromatic images corresponding to each of the different wavelengths of light to provide a viewfinder image of the viewfinder images, wherein the viewfinder image is a composite color viewfinder image.

19. The computer readable storage medium of claim 17, the operations further comprising:
updating the visual indicator according to scanning progress and intraoral scanner movement in a manner that provides real-time or near real-time scanning guidance.

20. The computer readable storage medium of claim 17, wherein the current field of view of the intraoral scanner is determined based on at least one of most recent intraoral scan data from the intraoral scan data or a most recent viewfinder image from the viewfinder images.

21. The computer readable storage medium of claim 17, further comprising:
   determining the visual indicator based on at least one of the current field of view or the determined portions of the intraoral scanner that have been scanned.

22. The computer readable storage medium of claim 17, wherein the intraoral scan data comprises a plurality of monochromatic images, and wherein focused and unfocused areas of each the plurality of monochromatic images differs based on an associated wavelength of light captured in the respective monochromatic images, the operations further comprising:
   processing each of the plurality of monochromatic images to identify focused areas therein.

* * * * *